United States Patent Office 3,646,146
Patented Feb. 29, 1972

3,646,146
DIPHENYLCYCLOPROPYL-METHYL-AMINES
Uberto Teotino and Davide Della Bella, Milan, Italy, assignors to Whitefin Holding S.A., Lugano, Switzerland
No Drawing. Filed Jan. 17, 1967, Ser. No. 609,771
Int. Cl. C07c 87/32
U.S. Cl. 260—570.5 CA                8 Claims

ABSTRACT OF THE DISCLOSURE

Diphenylcyclopropyl-methyl-amines having fairly low toxicity and serving as central nervous system stimulants with marked anti-depressant activity, represented by the formula:

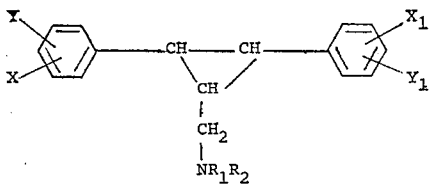

wherein X, Y, $X_1$, $Y_1$ are members selected from the group consisting of hydrogen, methyl and methoxy; $R_1$ is a hydrogen atom or an alkyl radical containing from 1 to 4 carbon atoms; $R_2$ is hydrogen atom or alkyl radical containing from 1 to 4 carbon atoms, dimethylaminoethyl, dimethylaminopropyl, methylaminopropyl, 2,3-diphenyl-cyclopropane-1-methyl, cyclohexyl radicals and their pharmaceutically acceptable salts with organic and inorganic acids.

---

These products, as well as their salts, are central nervous system stimulants.

They may be prepared:

(a) By reaction of compounds of the formula

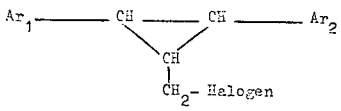

with a primary or secondary amine.

(b) By reduction of the corresponding compounds of the general formula

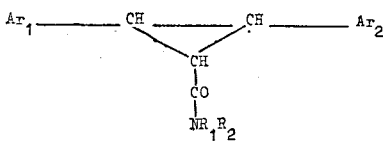

(c) By reaction of compounds of formula

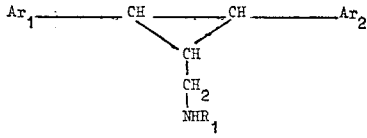

with compounds of formula $YR_2$ wherein Y is halogen.

(d) By reaction of compounds of formula

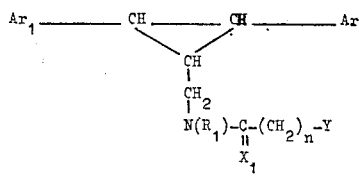

wherein $X_1 = 0$ or $H_2$, with a primary amine.

The invention also comprises as new compounds the intermediate products

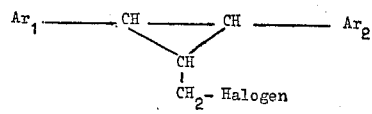

as well as a process for their preparation by halogenation of the corresponding carbinol.

This invention relates to novel diarylcyclopropane derivatives having valuable therapeutic utility and to processes for the preparation.

According to the present invention we provide, as new compounds, diarylcyclopropane derivatives of the general formula:

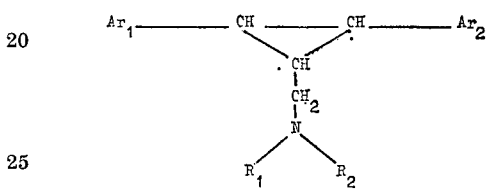

wherein $Ar_1$ and $Ar_2$ are the same or different and each is an aryl or substituted aryl radical, the substituents being one or more halogen atoms, (lower)-alkyl, (lower)-alkoxy, trifluoromethyl, hydroxy, nitro, amino, mono- or di-(lower)-alkylamino radicals; $R_1$ is a hydrogen atom, straight or branched chain alkyl radical, hydroxy-(lower) alkyl, aminoalkyl, N-monosubstituted aminoalkyl or N,N-disubstituted aminoalkyl radical; $R_2$ is a hydrogen atom, straight or branched chain alkyl radical, cycloalkyl, aryl-(lower)alkyl, arylcycloalkyl - (lower)alkyl, hydroxy-(lower)alkyl, halogenalkyl, aminoalky, N-mono-substituted aminoalkyl or N,N-di-substituted amino-alkyl, an acyl radical which may be substituted, or $R_1$ and $R_2$ together with the nitrogen atom to which they are linked represent a heterocyclic ring which may contain other ethero-atoms, and their salts with pharmaceutically acceptable organic and inorganic acids as well as with lower alkyl halogenides.

The invention also provides novel compounds having the formula

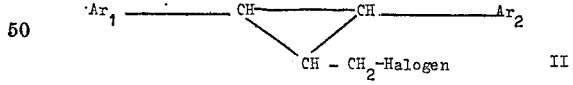

wherein $Ar_1$ and $Ar_2$ are as defined above which are useful intermediates in the preparation of the compounds of Formula I.

The invention further provides processes for preparing the novel therapeutically useful compounds of Formula I and/or their pharmaceutically acceptable salts with organic and inorganic acids as well as with lower alkyl halogenides, and for the preparation of the intermediate derivatives of Formula II.

The compounds of this invention may exist as cis-cis, cis-trans and trans-trans geometrical isomers and further as d,l and dl optical isomers. Unless otherwise specified it is intended to include in this invention all the separated geometrical isomers and the resolved optical isomers as well as mixtures thereof.

The compounds of this invention may be prepared according to various procedures which are practicable and capable of supplying the desired derivatives in good yield.

The preferred method for preparing the compounds of this invention comprises one or more of the following steps:

(a) reacting a compound of Formula II with an amine of formula $NHR_1R_2$ where $R_1$ and $R_2$ are as defined above (b) reducing a compound of the formula

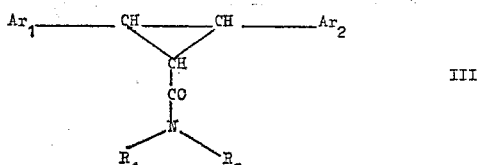

III (c) reacting a compounds of formula:

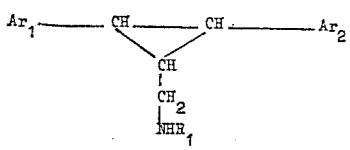

wherein $Ar_1$, $Ar_2$ and $R_1$ are as stated above with a compound of formula $R_2Y$ where $R_2$ is as defined above and Y is halogen.

(d) reacting a compound of Formula I, wherein $Ar_1$, $Ar_2$ and $R_1$ are as stated above, and $R_2$ is an halogenalkyl radical or a halogenalkylcarbonyl radical, with a primary or a secondary amine in the presence of an acid binding agent, to give the corresponding compound of Formula I wherein $R_2$ is a mono- or di-substituted aminoalkyl radical, or a mono- or di-substituted amino-alkyl-carbonyl radical and reducing, if desired, the mono- or the diaminoalkyl carbonyl radical to the corresponding mono- or di-substituted aminoalkyl radical.

The step (a) is carried out by adding the cyclopropane derivative to the amine or to an acid addition salt thereof in the presence of an acid binding agent, such as an excess of the amine itself or pyridine, a trialkyl amine, a N,N-dialkylaniline or an alkali metal carbonate or dicarbonate preferably at a temperature of 0° to 50° C. The cyclopropane derivative and/or the amine may be dissolved in a suitable organic solvent such as acetone, benzene, chloroform, diethyl ether or a mixture thereof.

Alternatively the cyclopropane derivative may be added to a concentrated aqueous solution of the amine. After bringing the reactants together, the reaction is completed by stirring the reaction mixture at a temperature of from 20° to 120° C. for a period of for example, from 15 minutes to 24 hours.

The step (b) may be advantageously carried out with lithium aluminum hydride in a suitable solvent such as diethyl ether, isopropyl ether, tetrahydrofuran, benzene, toluene at a temperature of from 35° to 110° C. for a period of, for example, from 1 to 24 hours.

When $R_2$ is an acyl radical, the step (c) is preferably carried out in the presence of an acid binding agent and of a suitable solvent at temperatures ranging from 0° to 50° C. When the acyl derivative is sufficiently stable toward the dilute alkalies the reaction may be conveniently carried out according to the Schotten-Baum method.

When $R_2$ is a straight or branched chain alkyl radical, cycloalkyl, aryl - (lower) - alkyl, aryl-cycloalkyl-(lower)-alkyl, hydroxy-(lower)-alkyl, aminoalkyl, N-monosubstituted aminoalkyl or a N,N-disubstituted aminoalkyl, the step (c) is preferably carried out in a sealed tube at temperatures above 50° C. in the presence of an acid binding agent and of a suitable solvent.

The step (d) is carried out in the presence of an acid binding agent and of a suitable solvent such as ethanol in a sealed tube at a temperature higher than 50° C.

The acid addition salts of this invention can be prepared in the usual manner, that is by reacting the base with either the stoichiometric amount of organic or inorganic acid in an aqueous miscible solvent, such as acetone or ethanol, with the isolation of the salt by concentration and cooling or little excess of the acid in an aqueous immiscible solvent, such as ethyl ether or chloroform, with the desired salt separating directly. These salts may also be prepared by the conventional method of double decomposition of appropriate salts which is well known in the art.

The preferred acids are those which form non-toxic salts and include, for example, hydrochloric, hydrobromic, sulphuric, citric, acetic, tartaric, maleic and toluenesulphonic acid.

The quaternary ammonium salts of this invention may also be prepared in conventional manner by reacting the tertiary amine with a (lower)-alkyl-halide, such as methyl bromide or methyl iodide, in a sealed tube with or without the presence of an inert solvent.

The preferred method for preparing the intermediate compounds of Formula II, comprises reacting the corresponding carbinol with a suitable halogenating agent, such as thionyl chloride, at a temperature higher than 10° C.

The novel diarylcyclopropane derivatives of this invention exhibit significant pharmacological properties and fairly low toxicity.

They are central nervous system stimulants. Their activity is very high and has been shown in mice, rats and rabbits either by the modification of the behaviour of the animal or in an indirect manner by the reversal of the depressing action produced by reserpine, pargiline or barbiturates. This antidepressant activity is not associated with monoamine oxidase inhibitory properties.

More particularly 1-(N-methyl)-amino-methyl-2,3-cis, trans-diphenyl-cyclopropane exhibits an antidepressant activity which was tested also by measuring the changes in pysostigmine induced EEG arousal reaction in conscious rabbits with implanted cortical and subcortical (hippocampus, thalamus) electrodes after administration of 2–5 mg./kg. of the above mentioned compound; the lethal dosage in the mice is higher than 100 mg./kg. per os, whereas a daily administration of 50 mg./kg. given orally for two months period in the rats is well tolerated.

These toxicological data are quite favourable considering that the effective dosage unit is of about 10–50 mg. in man.

The compounds of the present invention and their pharmaceutically acceptable salts with organic and inorganic acids as well as with lower alkyl halogenides may be administered orally, parenterally or rectally and may be associated with solid or liquid carriers in any of the suitable pharmaceutical forms such as tablets, capsules, suppositories or vials.

A particular composition which may be prepared and used in accordance with this invention without, however, limiting the same, is the following composition for parenteral use: 1-(N-methyl)-aminomethyl - 2,3 - cis,trans-diphenyl Cyclopropane hydrochloride _____ mg__ 25
Distilled water q.s.ad _____ ml__ 2

The vials are then sterilised at 110° C. for 40 minutes.
The following examples are given by way of illustration in order that the invention may be more fully understood:

EXAMPLE 1

1-(N-methyl)-aminomethyl-2,3-cis,trans-diphenyl-cyclopropane

A solution of 15 g. (0.059) N-methyl-2,3-cis,trans-diphenyl-cyclopropanecarbonamide (prepared according to the process disclosed in our copending application Ser. No. 609,754, filed concurrently herewith and now U.S. Pat. 3,562,276) in 70 cc. of anhydrous tetrahydrofuran was dropped, with stirring, into a suspension of 3 g. of LiAlH$_4$ in 100 cc. of anhydrous tetrahydrofuran, the temperature being kept below 30° C. When the addition was complete, the reaction mixture was refluxed for 16–24 hours.

After this time, a solution of 5 cc. of water in 5 cc. of tetrahydrofuran was added to the reaction mixture cooled at 10° C. During this addition the temperature of the reaction mixture was maintained below 25° C., whereupon the precipitate was filtered off and washed with tetrahydrofuran. The combined filtrate and washing were made neutral to Congo Red decolourised with carbon black, filtered and evaporated to dryness at 50° C. under reduced pressure. Yield, 12.3 g. of 1-(N-methyl)-aminomethyl-2,3-cis,trans-diphenyl-cyclopropane hydrochloride which melts at 168°–170° C.

This product may be crystallized from ethanol.

*Analysis.*—Calcd. for $C_{17}H_{20}ClN$ (percent): C, 74.57; H, 7.36; N, 5.12; Cl, 12.95. Found (percent): C, 74.81; N, 7.29; N, 5.13; Cl, 12.99.

Titrimetric value 100.58%; pKa $_{23.5°C.}$=8.61.

The base was separated as follows: after dissolving the hydrochloric salt in water the aqueous solution was alkalised with potassium carbonate and shaken with ether. The ether layer was separated, dried over potassium carbonate and evaporated under reduced pressure. The oily residue was fractioned and the product boiling at 135°–140° C./0.8–1 mm. collected.

In a similar manner the following compounds have been prepared:

1-aminomethyl-2,3-cis,trans-diphenylcyclopropane hydrochloride

M.P.=260°–262° C. (from ethyl alcohol).

*Analysis.*—Calcd. for $C_{16}H_{18}ClN$ (percent): C, 73.97; H, 6.98; N, 5.39; Cl, 13.65. Found (percent): C,73.59; H, 7.04; N, 5.40; Cl, 13.71.

1-(N-ethyl)-aminomethyl-2,3-cis,trans-diphenylcyclo propane

B.P.=120°–130° C./0.1 mm.; acidimetric value= 99.24%. pKb$_{26°\ C.}$=4.245 $n_D^{20}$=1.5753.

*Analysis.*—Calcd. for $C_{18}H_{21}N$ (percent): C, 86.01; H, 8.42; N, 5.57. Found (percent): C, 85.95; H, 8.27; N, 5.72, its hydrochloride salt melts at 134°–135° C. (from ethyl alcohol).

1-(N,N'-dimethyl)-aminomethyl-2,3-cis,trans-diphenylcyclopropane

B.P.=147°–150° C./1 mm.; acidimetric value= 99.43%. pKa$_{26.5°\ C.}$=8.00; $n_D^{20}$=1.5768. Ultraviolet peak of a methanol solution (3.06.10$^{-5}$ M/1) at 223 mμ (ε= 19.620).

*Analysis.*—Calcd. for $C_{18}H_{21}N$ (percent): C, 86.01; H, 8.42; N, 5.57. Found (percent): C, 85.77; H, 8.48; N, 5.61, its hydrochloride salt melts at 190°–192° c. (from ethyl alcohol).

1-(N,N-diethyl)-aminomethyl-2,3-cis,trans-diphenyl-cyclopropane hydrochloride

M.P.=175°–177° C. (from isopropyl alcohol); Acidimetric value=99.7%; pKa$_{24.5°\ C.}$=8.65.

*Analysis.*—Calcd. for $C_{20}H_{26}ClN$ (percent): C, 76.05; H, 8.30; N, 4.43; Cl, 11.22. Found (percent): C, 75.73; H, 8.33; N, 4.44; Cl, 11.25.

1-[N-(β-dimethylamino)ethyl]-aminomethyl-2,3-cis,trans-diphenylcyclopropane

B.P.=155°–160° C./0.3 mm. Its dihydrochloride salt melts at 221°–223° C. (from ethyl alcohol).

*Analysis.*—Calcd. for $C_{20}H_{28}Cl_2N_2$ (percent): C, 65.39; H,7.68; N, 7.63; Cl, 19.30. Found (percent): C, 65.02; H, 7.72; N, 7.63; Cl, 19.26.

1-[N-(γ-dimethylamino)-propyl]-aminomethyl-2,3-cis,trans-diphenylcyclopropane hydrochloride M.P.=215°–217° C. (from isopropyl alcohol).

*Analysis.*—Calcd. for $C_{21}H_{30}Cl_2N_2$ (percent): C, 66.14; H, 7.93; N, 7.34; Cl, 18.59. Found (percent): C, 65.78; H, 8.20; N, 7.37; Cl, 18.72.

N-(2,3-cis,trans-diphenylcyclopropane-1-methylen) pyrrolidine

B.P.=145°–146° C./0.4 mm.; its hydrochloride salt melts at 198°–200° C. (from ethyl alcohol).

*Analysis.*—Calcd. for $C_{20}H_{24}ClN$ (percent): C, 76.53; H, 7.71; N, 4.46; Cl, 11.30. Found (percent): C, 76.44; H, 7.73; N, 4.46; Cl, 11.32.

N-(2,3-cis,trans-diphenylcyclopropane-1-methylen)-morpholine

B.P.=165°–166° C./0.65 mm.; M.P. of its hydrochloric salt 210°–212° C. (from ethyl alcohol).

*Analysis.*—Calcd. for $C_{20}H_{24}ClNO$ (percent): C, 71.82; H, 7.33; N, 4.25; Cl, 10.75. Found (percent): C, 72.75; H, 7.37; N, 4.24; Cl, 10.79.

N-(2,3-cis,trans-diphenylcyclopropane-1-methylen)-piperidine

B.P.=143°–144° C./0.35 mm.; M.P.=48°–50° C.; M.P. of its hydrochloric salt=186°–188° C. (from ethyl alcohol).

*Analysis.*—Calcd. for $C_{21}H_{26}ClN$ (percent): C, 76.93; H, 7.99; N, 4.27; Cl, 10.81. Found (percent): C, 76.86; H, 8.02; N, 4.28; Cl, 10.84.

N-(2,3-cis,trans-diphenylcyclopropane-1-methylen)-N'-methylpiperazine dihydrochloride M.P.=273°–274° C. (dec.) from ethyl alcohol).

*Analysis.*—Calcd. for $C_{21}H_{28}Cl_2N_2$ (percent): C, 66.49; H, 7.44; N, 7.38; Cl, 18.69. Found (percent): C, 66.44; H, 7.47; N, 7.40; Cl, 18.71.

1-(N-isopropyl)-aminomethyl-2,3-cis,trans-diphenylcyclopropane

B.P.=141°–143° C./0.3 mm.; acidimetric value= 99.62%. Its hydrochloride salts melts at 156°–158° C. (from isopropyl alcohol).

*Analysis.*—Calcd. for $C_{19}H_{24}ClN$ (percent): C, 75.60; H, 8.01; N, 4.64; Cl, 11.75. Found (percent): C, 75.74; H, 8.08; N, 4.67; Cl, 11.71.

1-(N,N-di-sec.-butyl)-aminomethyl-2,3-cis,trans-diphenylcyclopropane

B.P.=180°–182°/1.5 mm.; acidimetric value=98.60%. Its hydrochloride salts melts at 190°–192° C. (from ethyl alcohol).

*Analysis.*—Calcd. for $C_{24}H_{34}ClN$ (percent): C, 77.49; H, 9.21; N, 3.77; Cl, 9.53. Found (percent): C, 77.25; H, 9.44; N, 3.78; Cl, 9.53.

N,N-bis-(2',3'-cis,trans-diphenylcyclopropane-1'-methylen)-ethylamine hydrochloride M.P.=190°–192° C. (from ethyl alcohol).

*Analysis.*—Calcd. for $C_{34}H_{36}ClN$: C, 82.65; H, 7.34; N, 2.83; Cl, 7.18. Found (percent): C, 82.63; H, 7.39; N, 2.80; Cl, 7.16.

1-(N-cyclohexyl)-aminomethyl-2,3-cis,trans-diphenylcyclopropane hydrochloride

M.P.=172–174° C. (from ethyl acetate).

*Analysis.*—Calcd. for $C_{22}H_{28}ClN$: C, 77.28; H, 8.25; N, 4.10; Cl, 10.37. Found (percent): C, 77.48; H, 8.30; N, 4.11; Cl, 10.48.

1-(N-methyl)-aminomethyl-2,3-cis,cis-diphenylcyclopropane

B.P.=120°–122° C./0.4 mm. Its hydrochloride salt melts at 210°–212° C. (from ethyl alcohol).

*Analysis.*—Calcd. for $C_{17}H_{20}ClN$ (percent): C, 74.57; H, 7.36; N, 5.12; Cl, 12.95. Found (percent): C, 73.89; H, 7.44; N, 5.10; Cl, 12.80.

1-(N-methyl)-aminomethyl-2,3-trans,trans-diphenylcyclopropane

B.P.=125°–127° C./0.7 mm. Its hydrochloride salt melts at 146°–148° C. (from ethyl acetate).

Analysis.—Calcd. for $C_{17}H_{20}ClN$ (percent): C, 74.57; H, 7.36; N, 5.12; Cl, 12.95. Found (percent): C, 74.56; H, 7.44; N, 5.10; Cl, 12.96.

1-(N-methyl)-aminomethyl-2-p-methylphenyl-3-phenylcyclopropane

B.P.=133°–135° C./0.4 mm.; acidimetric value= 98.61%.

Analysis.—Calcd. for $C_{18}H_{21}N$ (percent): C, 86.01; H, 8.42; N, 5.57. Found (percent): C, 85.47; H, 8.30; N, 5.61.

1-(N-methyl)-aminomethyl-2,3-cis,trans-bis(p-methoxyphenyl)cyclopropane

B.P.=174°–176°/0.6 mm.; acidimetric value=98.8%. Its hydrochloride salt melts at 168°–170° C. (from ethyl alcohol).

Analysis.—Calcd. for $C_{19}H_{24}ClNO_2$ (percent): C, 68.35; H, 7.25; N, 4.19; Cl, 10.62. Found (percent): C, 68.62; H, 7.29; N, 4.16; Cl, 10.62.

EXAMPLE 2

1-(chloroacetyl)-aminomethyl-2,3-cis,trans-diphenylcyclopropane 750 cc. of ethyl ether were added to 86.50 g. (0.33 mole) of 1-aminomethyl-2,3-cis, trans-diphenylcyclopropane hydrochloride dissolved in 900 cc. of water. Into this mixture, cooled to 5° C. and maintained under stirring, were dropped simultaneously a solution of 27 g. (0.675 mole) of sodium hydroxide in 200 cc. of water and a solution of 40 g. (0.35 mole) of chloroacetyl chloride in 173 cc. of anhydrous ethyl ether. The mixture was stirred for an hour longer allowing the temperature to rise up to room temperature. The ether layer was separated and the aqueous solution washed with ethyl ether. The combined ether extract and ether washings were washed with 1% HCl, 5% NaHCO₃ and water, dried on sodium sulphate and evaporated under vacuum. Yield 46.10 g. The product was purified by crystallisation from isopropyl ether. M.P.=93°–95° C.

In a similar manner has been prepared:

1-(β-chloropropionyl)-aminomethyl-2,3-cis,trans-diphenylcyclopropane

M.P.=79°–81° C. (from isopropyl ether).

EXAMPLE 3

1-(dimethylaminoacetyl)-aminomethyl-2,3-cis,trans-diphenylcyclopropane 10 g. (0.033 mole) of 1 - chloroacetyl) - aminomethyl-2,3-cis, trans - diphenylcyclopropane (prepared according to the process disclosed in Example 2) and 100 cc. (0.44 mole) of 20% w./w. ethanolic dimethylamine were placed in a sealed tube at 100° C.

After 30 hours the solvents were evaporated under reduced pressure. The residue was dissolved in 10% HCl, decolourised with carbon black, filtered, saturated with potassium carbonate and shaken with chloroform. The chloroform extract was dried on sodium sulphate and the chloroform removed. After washing with petroleum ether the residue was dried. Yield, 9.5 g. The product was purified by crystallisation from isopropyl ether. M.P.=110°–112° C.

Analysis.—Calcd. for $C_{20}H_{24}N_2O$ (percent): C, 77.88; H, 7.84; N, 9.08. Found (percent): C, 77.81; H, 7.81; N, 9.12.

This method has been used for the preparation of the following compound:

1-(diethylaminoacetyl)-aminomethyl-2,3-cis,trans-diphenylcyclopropane

M.P.=95°–97° C. (from isopropyl ether).

Analysis.—Calcd. for $C_{22}H_{28}NO_2$ (percent): C, 78.53; H, 6.39; N, 8.32. Found (percent): C, 78.50; H, 8.37; N, 8.31.

1-(methylaminoacetyl)-aminomethyl-2,3-cis,trans-diphenylcyclopropane

M.P.=88°–91° C. (from isopropyl ether) its hydrochloride salt melts at 195°–197° C. (from anhydrous ethyl alcohol).

Analysis.—Calcd. for $C_{19}H_{23}ClN_2O$ (percent): C, 68.97; H, 7.00; N, 8.47; Cl, 10.72. Found (percent): C, 68.98; H, 6.92; N, 8.48; Cl; 10.75.

1-(ethylaminoacetyl)-aminomethyl-2,3-cis,trans-diphenylcyclopropane

M.P.=95°–97° C. (isopropyl ether).

Analysis.—Calcd. for $C_{20}H_{24}N_2O$ (percent): C, 77.88; H, 7.84; N, 9.08. Found (percent): C, 77.81; H, 7.81; N, 9.08. Its hydrochloride salt melts at 195°–197° C.

1-(β-methylaminopropionyl)-aminomethyl-2,3-cis,trans-diphenylcyclopropane

B.P.=200°–220° C./0.1 mm.

By reducing this compound with LiAlH₄ according to the process disclosed in Example 1 has been prepared the 1-(γ-methylaminopropyl)-aminomethyl-2,3-cis,trans-diphenylcyclopropane dihydrochloride M.P.=246°–248° C. (from ethyl alcohol).

Analysis.—Calcd. for $C_{20}H_{28}Cl_2N_2$ (percent): C, 65.39; H, 7.68; N, 7.63; Cl. 19.30. Found (percent): C, 65.45; H, 7.80; N, 7.63; Cl, 19.01.

EXAMPLE 4

N-(2,3-cis,trans-diphenylcyclopropane-1-methylen)-pyrrolidine

A solution of 36 g. (0.15 mole) 2,3-cis,trans-diphenylcyclopropane-1-carboxylic acid in 200 cc. of anhydrous tetrahydrofuran was dropped, with stirred, into a suspension of 12 g. of LiAlH₄ in 200 cc. of anhydrous tetrahydrofuran boiling with gentle reflux. When the addition was complete, the reaction mixture was refluxed for two hours.

After this time, a solution of 50 cc. of water in 50 cc. of tetrahydrofuran was added to the reaction mixture maintained below 25° C. with an ice-bath. The precipitate was filtered off and washed with tetrahydrofuran. The combined filtrate and washings were evaporated to dryness under reduced pressure, the oily residue distilled. The fraction boiling at 142°–144°/0.4 mm. was collected.

26 g. of 2,3 - cis,trans-diphenylcyclopropane-1-carbinol thus obtained was dissolved in 100 cc. of benzene and dropped, with stirring, into a solution of 20 cc. of thionyl chloride in 100 cc. of benzene. After standing overnight the solvent and unreacted thionyl chloride were removed by distillation. The residue was fractionated under vacuo and the product boiling at 120°–123° C./0.1 mm. collected.

4.8 g. (0.02 mole) of 1-chloromethyl-2,3-cis,trans-diphenylcyclopropane thus obtained and 4.8 g. (0.67 mole) of pyrrolidine and 50 cc. of anhydrous ethyl alcohol were placed in a sealed tube and heated at 120° C. for 24 hours. The reaction mixture was cooled and concentrated to dryness. The residue was suspended in water and dissolved by acidification to Congo Red with hydrochloric acid. After washing with ethyl ether the aqueous solution was saturated with potassium carbonate. The mixture was shaken with ethyl ether and the ethereal extract was washed with water and dried over magnesium sulfate. After evaporation of the solvent the oily residue was distilled under reduced pressure. The fraction boiling at 145°–146° C./ 0.4 mm. was collected.

Its methiodide salt melts at 174°–176° C. (from ethyl alcohol).

We claim:

1. A compound of the formula

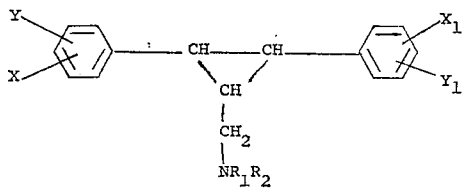

wherein X, Y, X₁, Y₁ are members selected from the group consisting of hydrogen, methyl and methoxy; R₁ is a hydrogen atom or an alkyl radical containing from 1 to 4 carbon atoms; R₂ is a hydrogen atom or alkyl radical containing from 1 to 4 carbon atoms, dimethylaminoethyl, dimethylaminopropyl, methylaminopropyl, 2,3 - diphenylcyclopropane - 1-methyl, cyclohexyl radicals and their salts with pharmaceutically acceptable organic and inorganic acids.

2. A compound of the formula

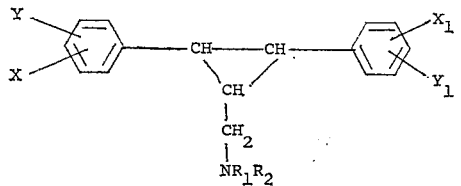

wherein X, Y, X₁, Y₁ are members selected from the group consisting of hydrogen and methyl; R₁ is a hydrogen atom or an alkyl radical containing from 1 to 4 carbon atoms; R₂ is a hydrogen atom or alkyl radical containing from 1 to 4 carbon atoms, dimethylaminoethyl, dimethylaminopropyl, methylaminopropyl, 2,3-diphenylcyclopropane-1-methyl, cyclohexyl radicals and their salts with pharmaceutically acceptable organic and inorganic acids.

3. A compound of the formula

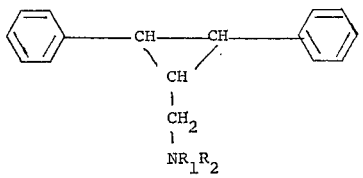

wherein R₁ is a hydrogen atom or an alkyl radical containing from 1 to 4 carbon atoms; R₂ is a hydrogen atom or alkyl radical containing from 1 to 4 carbon atoms, dimethylaminoethyl, dimethylaminopropyl, methylaminopropyl, 2,3 - diphenylcyclopropane-1-methyl, cyclohexyl radicals and their salts with pharmaceutically acceptable organic and inorganic acids.

4. 1 - (N-methyl)-aminomethyl-2,3-cis,trans-diphenylcyclopropane and its salts with pharmaceutically acceptable organic and inorganic acids.

5. 1 - (N-methyl)-aminomethyl - 2,3-cis,cis-diphenylcyclopropane.

6. 1 - (N-methyl)-aminomethyl-2,3-trans,trans-diphenylcyclopropane.

7. 1 - (N-isopropyl)-aminomethyl-2,3-cis, trans-diphenylcyclopropane.

8. 1-(N-isobutyl) - aminomethyl - 2,3-cis, trans-diphenylcyclopropane.

References Cited

UNITED STATES PATENTS

| | | | |
|---|---|---|---|
| 3,052,721 | 9/1962 | Bernstein et al. | 260—570.5 X |
| 3,098,076 | 7/1963 | Baltzly et al. | 260—570.9 X |
| 3,405,139 | 10/1968 | Haack et al. | 260—570.5 X |
| 3,419,604 | 12/1968 | Kaiser et al. | 260—570.5 X |
| 3,449,427 | 6/1969 | Kaiser et al. | 260—570.8 |

FOREIGN PATENTS

| | | | |
|---|---|---|---|
| 973,887 | 10/1964 | Great Britain | 260—570.5 |

OTHER REFERENCES

Kaiser et al. III, "Jour. Med. & Pharm. Chem," vol. 5, No. 6, p. 1243 and 1247 (1962).

ROBERT V. HINES, Primary Examiner

U.S. Cl. X.R.

260—247, 247.2 A, 268 C, 268 R, 293 R, 294 A, 326.3, 326.8, 501.1, 501.18, 501.19, 501.21, 514 R, 557 R, 561 A, HL, 567.6 M, 570.5 PA, 612 R, 618 H, 646, 649 R